(12) United States Patent
Chui et al.

(10) Patent No.: US 6,389,160 B1
(45) Date of Patent: May 14, 2002

(54) HYBRID WAVELET AND JPEG SYSTEM AND METHOD FOR COMPRESSION OF COLOR IMAGES

(75) Inventors: Charles K. Chui, Menlo Park; Haishan Wang, Stanford, both of CA (US)

(73) Assignee: PicSurf, Inc., Mountain View, CA (US)

( * ) Notice: Subject to any disclaimer, the term of this patent is extended or adjusted under 35 U.S.C. 154(b) by 0 days.

(21) Appl. No.: 09/289,458

(22) Filed: Apr. 9, 1999

(51) Int. Cl.[7] .............................. G06K 9/00; G06K 9/36
(52) U.S. Cl. ..................... 382/166; 382/239; 382/240
(58) Field of Search ................................ 382/162, 166, 382/239, 240, 232, 233; 358/430, 520

(56) References Cited

U.S. PATENT DOCUMENTS 6,002,794 A * 12/1999 Bonneau et al. ............ 382/166
6,163,625 A * 12/2000 Ng et al. ..................... 382/239
6,259,819 B1 * 7/2001 Andrew et al. ............. 382/166

* cited by examiner

*Primary Examiner*—Bhavesh Mehta
(74) *Attorney, Agent, or Firm*—Pennie & Edmonds LLP (57) ABSTRACT

A data encoder and method encodes color image data. The image data include Y, U and V data. A data image quality level is selected, which corresponds to a compression ratio. The Y data is encoded using a wavelet or wavelet-like compression method in accordance with the selected data image quality level. When the compression ratio is less than a threshold value, indicating a low compression ratio, the U and V data are compressed using a JPEG compression method. Otherwise the U and V data are compressed using the wavelet or wavelet-like compression method. The encoded image data includes an indication of which compression method was used to encode the U and V data. When encoded image data is decoded by a data decoder, the decoder determines which compression method was used to encode the U and V data, and then decodes the encoded image data accordingly.

12 Claims, 4 Drawing Sheets

HYBRID WAVELET AND JPEG SYSTEM AND METHOD FOR COMPRESSION OF COLOR IMAGES

The present invention relates generally to systems and methods for compression and reconstruction of color image data, and particularly to a system and method for efficiently encoding YUV image data.

BACKGROUND OF THE INVENTION

Digital images and digital video signals are often encoded in the $YC_bC_r$ format, where Y is the "luminance" signal, and $C_b$ and $C_r$ are "color-difference" signals that carry chrominance information. Note that the $YC_bC_r$ color space is sometimes loosely referred to as the YUV color space. In actuality, YUV (which we will hereinafter refer to as Y'UV) signals are typically used as an intermediate step in the formation of composite NTSC/PAL color television signals. The Y', U and V signals are respectively related to the Y, $C_b$ and $C_r$ signals as follows:

$$Y'=1.164(Y-16)$$

$$U=C_b-128$$

$$V=1.4(C_r-128)$$

Nevertheless, for the purposes of this document, the terms YUV and $YC_bC_r$ will be used synonymously, since the information content of the each of the Y', U and V signal components in YUV signals is exactly the same as the information content of the Y, $C_b$ and $C_r$ components of $YC_bC_r$ signals.

Color monitors such as those used as the display terminals for personal computers, as well as the liquid crystal displays in digital cameras and other devices, are usually driven by signals encoded in an RGB (Red, Green, Blue) format. Therefore, a transformation from the $YC_bC_r$ format to the RGB format is required in order to display a $YC_bC_r$-encoded video signal on a color monitor. The relationship between $YC_bC_r$ and RGB signals can be specified by the following matrix of equations:

$$R=1.164(Y-16)+1.596(C_r-128)$$

$$G=1.164(Y-16)-0.813(C_r-128)-0.391(C_b-128)$$

$$B=1.164(Y-16)+2.018(C_b-128)$$

This $YC_bC_r$ to RGB conversion is compliant with CCIR Recommendation 601-1, Reports of the International Radio Consultative Committee, International Telecommunications Union. The inverse equations, for converting RGB data to $YC_bC_r$ format are:

$$Y=0.299*R+0.587*G+0.114*B$$

$$C_b=-0.169*R-0.331*G-0.500*B+128$$

$$C_r=0.500*R-0.419*G-0.081*B+128$$

JPEG is a standardized still image compression mechanism. JPEG stands for Joint Photographic Experts Group, the original name of the group that formed the standard. JPEG is designed for compressing either full-color or gray scale images. In this document, only the "lossy" mode of JPEG will be considered. This means that the decompressed image is not exactly the same as the original image. In general, reconstructed image quality using JPEG compression can vary over a wide range and is a function of the compression ratio, which is the ratio of the original image data size to the size of the compressed data. Reconstructed image quality can range from being virtually indistinguishable from the source image (for example, at a JPEG compression ratio of 3) to abstract art (at compression ratios of 100 times smaller than the original). Generally, visible differences in the reconstructed image as compared to the source image begin to occur at compression ratios between ten and twenty times smaller than the original.

Wavelets are mathematical functions that filter data into different frequency components. For the purposes of this document, the term "wavelet compression" is defined to mean (A) the application of a wavelet (or wavelet-like) decomposition transform to a set of data, which produces a set of decomposition coefficients (also called wavelet coefficients), (B) quantization of the coefficients, and (C) encoding of the quantized decomposition coefficients. Application of the wavelet decomposition transform, by itself, is lossless, meaning that no information is lost. The encoding step is also lossless. However, the quantization step, in which all the coefficients are divided by a value (called the quantization divisor) that corresponds to a selected compression ratio, causes information loss. The amount of information loss corresponds generally to the size of the quantization divisor.

As with JPEG compression, when wavelet compression is used, the reconstructed image quality can vary over a wide range and is also a function of the compressed ratio. Wavelet compressed YUV image data tends not to vary as greatly in image quality as similarly compressed and restored JPEG images. However, the inventors of the present invention have noticed that at "low" compression ratios (e.g., compression ratios of less than twenty to one (20:1)) JPEG compression achieves better quality compression of U and V data than wavelet decomposition transforms, while at high compression levels (e.g., compression ratios of more than 20:1) wavelet compression achieves better quality compression of U and V data than JPEG compression. That is, at low compression levels, JPEG compressed U and V data, when reconstructed, usually results in a higher quality image than wavelet compressed U and V data for the same amount of data compression. However, wavelet compression usually outperforms JPEG compression at all compression ratios for Y data.

Actually, the "high/low" compression ratio analysis is not quite as simple as noted above, because at very low compression ratios, below 5:1, there is essentially no difference between wavelet and JPEG in reconstructed image quality. However, these "super-low" compression ratios are used primarily when lossless image processing is required, which typically limits the compression ratio to about 2.5:1.

The present invention is an improvement over the compression mechanisms typically used for compressing still, digital, color image data. One object of the present invention is to improve the image quality of compressed and reconstructed still digital images. The present invention accomplishes this objective by providing a hybrid encoding methodology and system for utilizing the relative strengths of the JPEG and wavelet decomposition transform compression mechanisms at different compression ratios to compress digital image data.

SUMMARY OF THE INVENTION

In summary, the present invention is a unified system and method for encoding and decoding YUV image data. To compress raw image data, an encoding procedure is executed. Prior to executing the encoding procedure, or alternately at the beginning of the encoding procedure, one or more data preparation steps may be performed. Data preparation begins by determining if raw image data is in the YUV data format. For example, if the raw image data is RGB data, a data converter is used to convert the raw image data from RGB data to YUV data, using well known conversion equations.

The data encoding procedure compresses the Y data using wavelet compression. The U and V data (or $C_b$ and $C_r$ data) is compressed either by performing wavelet compression or JPEG compression, depending on the compression ratio or image quality level selected.

At low compression ratios (e.g., less than a specified or predefined threshold, Th) the image data encoding method uses JPEG compression to compress the U and V data because JPEG compression achieves better quality compression of U and V data than wavelet decomposition transforms. That is, at low compression levels (e.g., compression ratios below 20:1), JPEG compressed U and V data, when reconstructed, usually results in a higher quality image than wavelet compressed U and V data for the same amount of data compression. At higher compression levels, the data encoding method uses wavelet compression to compress the U and V data, which achieves better quality compression of U and V data than JPEG compression.

To reconstruct a compressed image, a data decoding procedure is executed. Prior to the executing the data decoding procedure, of alternately during its execution, the type of encoding transformation (wavelet or JPEG) used to compress and encode the U and V data is determined. This information is used to access the appropriate transform decoder module for decoding the compressed U and V data. The decoding procedure reverses the process performed by the encoding method.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

For the purposes of this document, the term "wavelet" shall be understood to mean "wavelet or wavelet like". Thus, a reference to a wavelet transform shall mean a wavelet or wavelet like transform.

The term YUV shall be used synonymously with the term $YC_bC_r$, as discussed above in the Background of the Invention section of this document.

Digital Camera Embodiment

Figure 1:
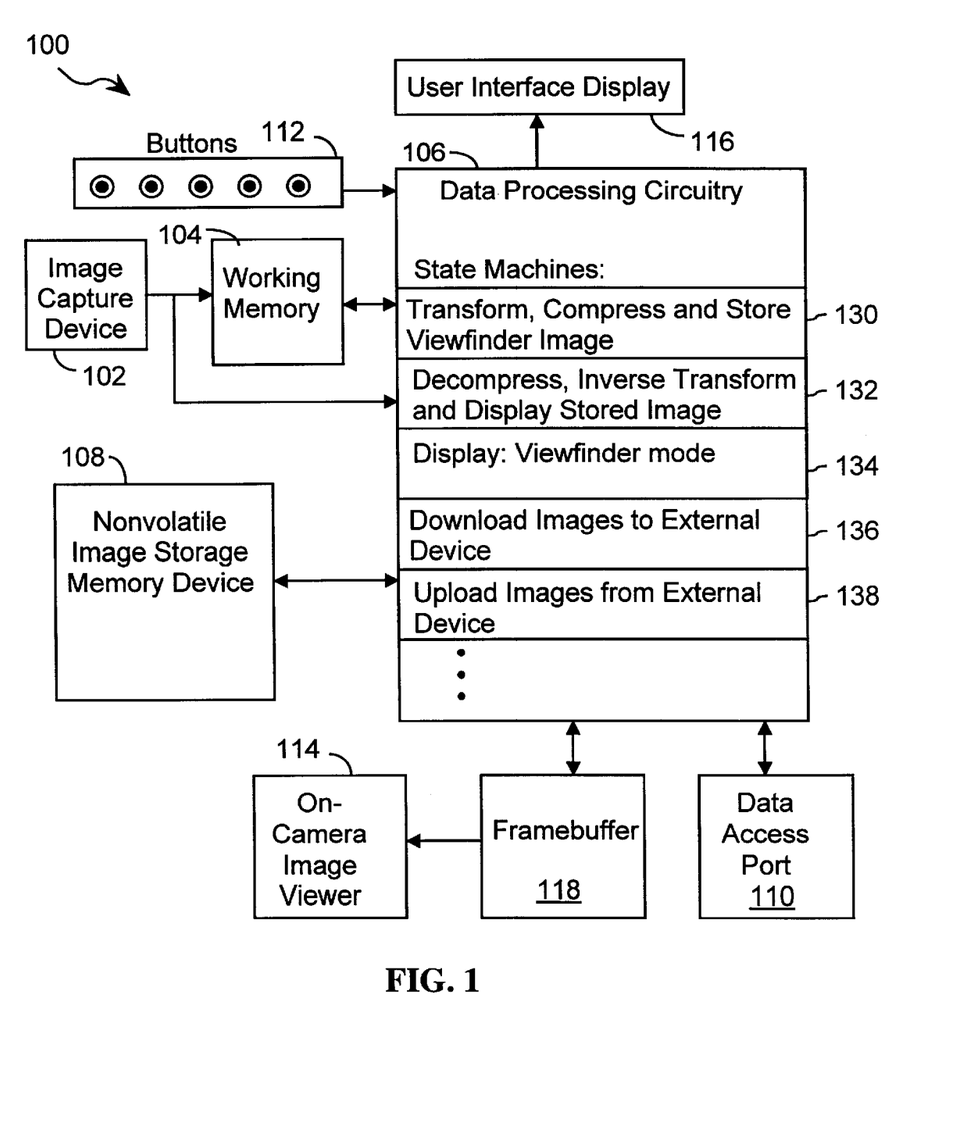
FIG. 1 is a block diagram of an digital camera incorporating a first preferred embodiment of the present invention.

Referring to FIG. 1, there is shown an embodiment of a digital camera system 100 in accordance with the present invention. The digital camera system 100 includes an image capture device 102, such as a CCD sensor array, CMOS sensor array, or any other mechanism suitable for capturing an image as an array of digitally encoded information. Thus the image capture device is assumed to include analog to digital conversion (ADC) circuitry for converting analog image information into digital values.

A working memory 104, typically random access memory, receives digitally encoded image information from the image capture device 102. More generally, it is used to store a digitally encoded image while the image is being transformed and compressed and otherwise processed by the camera's data (i.e., image) processing circuitry 106. The data processing circuitry 106 in one embodiment consists of hardwired logic and a set of state machines for performed a set of predefined image processing operations.

In alternate embodiments the data processing circuitry 106 could be implemented in part or entirely using a fast general purpose microprocessor and a set of software procedures. However, at least using the technology available in 1999, it would be difficult to process and store full resolution images (e.g., full color images having 1280×840 pixels) fast enough to enable the camera to be able to take, say, twenty pictures per second, which is a requirement for some commercial products. If, through the use of parallel processing techniques or well designed software a low voltage, general purpose image data microprocessor could support the fast image processing needed by digital cameras, then the data processing circuit 106 could be implemented using such a general purpose microprocessor.

Each image, after it has been processed by the data processing circuitry 106, is typically stored as an "image file" in a nonvolatile memory storage device 108, typically implemented using "flash" (i.e., EEPROM) memory technology. The nonvolatile memory storage device 108 is preferably implemented as a removable memory card. This allows the camera's user to remove one memory card, plug in another, and then take additional pictures. However, in some implementations, the nonvolatile memory storage device 108 may not be removable, in which case the camera will typically have a data access port 110 to enable the camera to transfer image files to and from other devices, such as general purpose, desktop computers. Digital cameras with removable nonvolatile memory 108 may also include a data access port 110.

The digital camera 100 includes a set of buttons 112 for giving commands to the camera. In addition to the image capture button, there will typically be several other buttons to enable the use to select the quality level of the next picture to be taken, to scroll through the images in memory for viewing on the camera's image viewer 114, to delete images from the nonvolatile image memory 108, and to invoke all the camera's other functions. Such other functions might include enabling the use of a flash light source, and transferring image files to and from a computer. The buttons in one embodiment are electromechanical contact switches, but in other embodiments at least some of the buttons may be implemented as touch screen buttons on a user interface display 116, or on the image viewer 114.

Each user selectable quality level will typically have an associated compression ratio (CR).

The user interface display 116 is typically implemented either (A) as an LCD display device separate from the image viewer 114, or (B) as images displayed on the image viewer 114. Menus, user prompts, and information about the images stored in the nonvolatile image memory 108 may be displayed on the user interface display 116, regardless of how that display is implemented.

After an image has been captured, processed and stored in nonvolatile image memory 108, the associated image file may be retrieved from the memory 108 for viewing on the image viewer. More specifically, the image file is converted from its transformed, compressed form back into a data array suitable for storage in a framebuffer 118. The image data in the framebuffer is displayed on the image viewer 114.

The digital camera 100 preferably includes data processing circuitry 106 for performing a predefined set of primitive operations, such as performing the multiply and addition operations required to apply a JPEG or wavelet transform to a certain amount of image data, as well as a set of state machines 130–138 for controlling the data processing circuitry so as to perform a set of predefined image handling operations. In one embodiment, the state machines in the digital camera are as follows.

One or more state machines 130 for transforming, compressing and storing an image received from the camera's image capture mechanism. This image is sometimes called the "viewfinder" image, since the image being processed is generally the one seen on the camera's image viewer 114. This set of state machines 106 are the ones that initially generate each image file stored in the nonvolatile image memory 108. Prior to taking the picture, the user specifies the quality level of the image to be stored, using the camera's buttons 112.

One or more state machines 132 for decompressing, inverse transforming and displaying a stored image file on the camera's image viewer. The reconstructed image generated by decompressing and inverse transforming the image data is stored in camera's framebuffer 118 so that it can be viewed on the image viewer 114.

One or more state machines 134 for implementing a "viewfinder" mode for the camera in which the image currently "seen" by the image capture mechanism 102 is displayed on the image viewer 114 so that the user can see the image that would be stored if the image capture button is pressed. These state machines transfer the image received from the image capture device 102, possibly after appropriate remedial processing steps are performed to improve the raw image data, to the camera's framebuffer 118.

One or more state machines 136 for downloading images from the nonvolatile image memory 108 to an external device, such as a general purpose computer.

One or more state machines 138 for uploading images from an external device, such as a general purpose computer, into the nonvolatile image memory 108. This enables the camera to be used as an image viewing device, and also as a mechanism for transferring image files on memory cards.

The specific data processing methods used by state machines 132 to compress image data are not relevant to the present discussion because the present invention can be implemented using well known, conventional wavelet and JPEG data processing methods. However, an embodiment of the wavelet transform and compression methodology used in a preferred embodiment is described in U.S. patent application Ser. No. 08/758,224, filed Nov. 27, 1996, "System and Method for Performing Wavelet and Inverse Wavelet Like Transformations of Digital Data Using Only Add and Bit Shift Arithmetic Operations," which is hereby incorporated by reference as background information.

A preferred embodiment the third substep of wavelet compression (i.e., the step of encoding the quantized decomposition coefficients) is described in detail in U.S. patent application Ser. No. 08/758,590, filed Nov. 27, 1996, entitled "System and Method for Nested Split Coding of Sparse Data Sets," now U.S. Pat. No. 5,748,116, which is hereby incorporated by reference as background information.

General Purpose Computer Implementation

Figure 2:
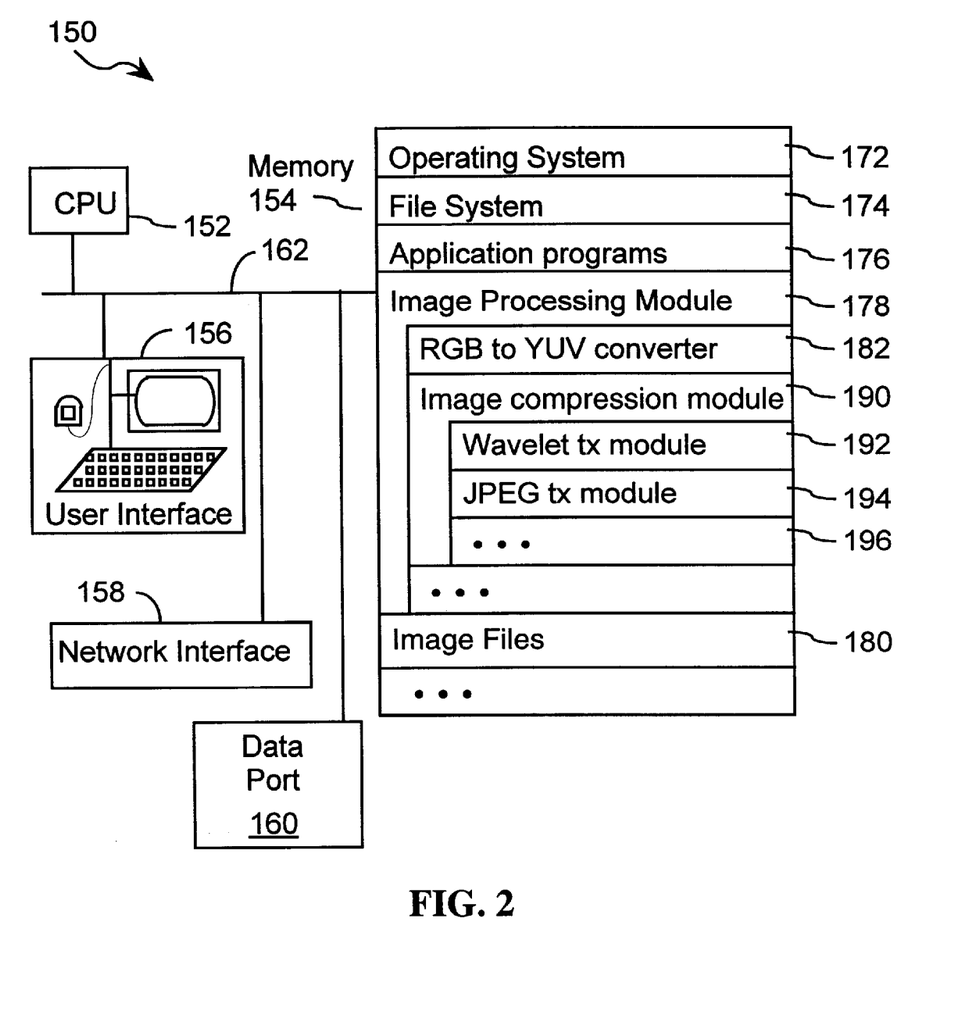
FIG. 2 is a block diagram of a general purpose computer system incorporating a second preferred embodiment of the present invention.

Referring to FIG. 2, the present invention may also be implemented using a programmed general purpose computer 150. The computer system 150 includes:

one or more data processing units (CPU's) 152, memory 154, which will typically include both high speed random access memory as well as non-volatile memory;

a user interface 156; a network or other communication interface 158 for communicating with other computers as well as other devices;

a data port 160, such as for sending and receiving images to and from a digital camera (although such image transfers might also be accomplished via the network interface 158); and one or more communication busses 162 for interconnecting the CPU(s) 152, memory 154, user interface 156, network interface 158 and data port 160.

The computer system's memory 154 stores procedures and data, typically including:

an operating system 172 for providing basic system services;

a file system 174, which may be part of the operating system;

application programs 176, such as user level programs for viewing and manipulating images, an image processing module 178, for performing various image processing functions including those that are the subject of the present document;

image files 180 representing various images.

The image processing module 178 may include:

an RGB to YUV image data converter, for converting a image data from RGB form to YUV form, using the well known conversion equations noted earlier in this document; and an image compression module 190 that handles the compression and decompression of image data. This image compression module 190 preferably includes a wavelet transform module 192 as well as a JPEG transform module 194.

Data Compression Procedure

Figure 3:
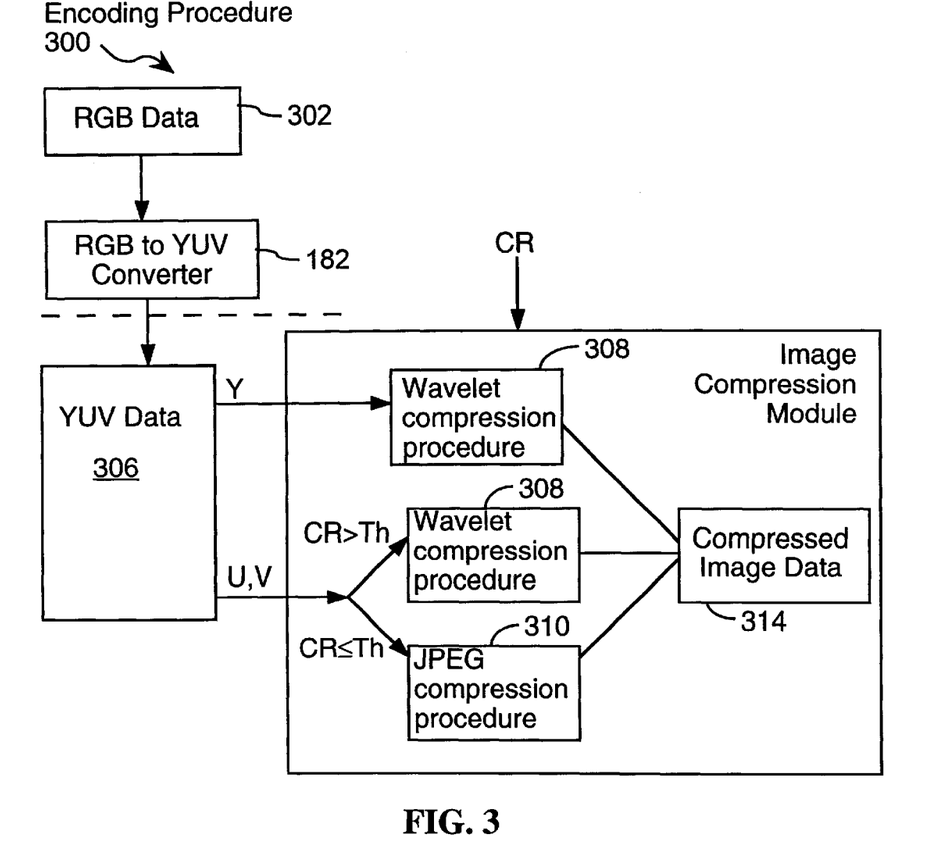
FIG. 3 is a flow chart of a preferred embodiment of the data encoding method of the present invention.

Referring to FIG. 3, prior to the execution of the encoding procedure 300, or alternately at the beginning of the encoding procedure, one or more data preparation procedures will typically be performed. In preferred embodiments, data preparation begins by determining if raw image data is in RGB data format 302, and if so, using a RGB to YUV converter 182 to convert the RGB data 302 to YUV data 306.

As indicated earlier, the user will typically select one of a predefined set of image quality levels, either when the image is first captured, or at the time the image encoding procedure 300 is executed. Each user selectable image quality level an associated compression ratio (CR).

The image data 306 includes Y, U and V data. The encoder procedure 300 encodes the Y data by executing a wavelet decomposition procedure that generates a set of wavelet coefficients, and then executing an encoding procedure to quantize and encode the wavelet coefficients. These procedures are herein jointly referred to as the wavelet compression procedure 308, which is part of the wavelet transform module 192 (FIG. 2).

The encoding method used by the encoder procedure 300 to encode the U and V (or $C_b$ and $C_r$ data) data depends on the user selected compression ratio, or equivalently the user selected image quality level.

In the preferred embodiment, "low compression ratios" is defined as a range of compression ratios, such as 5:1 to 20:1. Alternately, "low compression ratios" may be defined as compression ratios in the range of 1:1 to 20:1, or equivalently compression ratios below a threshold of 20:1.

At low compression ratios (e.g., compression ratios less than a predefined threshold, Th, or compression ratios in a predefined range CR1 to CR2 such as 5:1 to 20:1), the U and V data is encoded using a JPEG compression procedure 310 in the JPEG transform module 194 (FIG. 2), because at low compression ratios JPEG compression achieves better quality compression of U and V data than wavelet compression. That is, at low compression levels (e.g., compression ratios below 20:1, or in the range of 5:1 to 20:1), JPEG compressed U and V data, when reconstructed, usually results in a higher quality image than wavelet compressed U and V data for the same amount of data compression. At higher compression levels (e.g., compression ratios of twenty and higher), the U and V data is encoded using the wavelet compression procedure 308 in the wavelet transform module 192, because wavelet compression achieves better quality compression of U and V data than JPEG compression at high compression levels.

The encoding procedure writes the compressed image data into a compressed image data structure 314, often called an image file.

Figure 4:
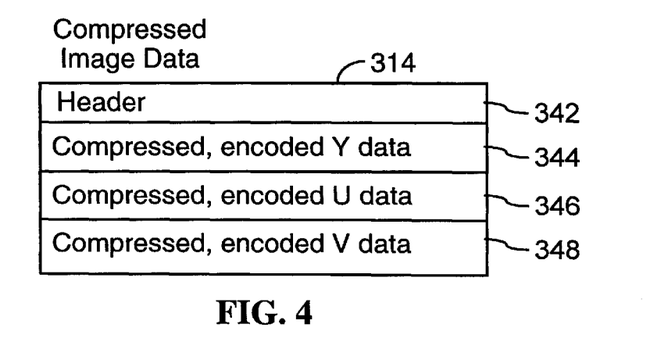
FIG. 4 depicts a table data structure used by both the data encoder and the data decoder of an embodiment to keep track of the processed image data.

Referring to FIG. 4, the compressed image data structure 314 includes a header 342 as well as the compressed Y data 344, U data 346, and V data 348 respectively. In a preferred embodiment the header 342 stores information indicating (a) whether the UV data was compressed using wavelet or JPEG compression, and (b) offsets into the data structure pointing to the compressed and encoded Y, U and V data respectively.

Data Decompression Procedure

Figure 5:
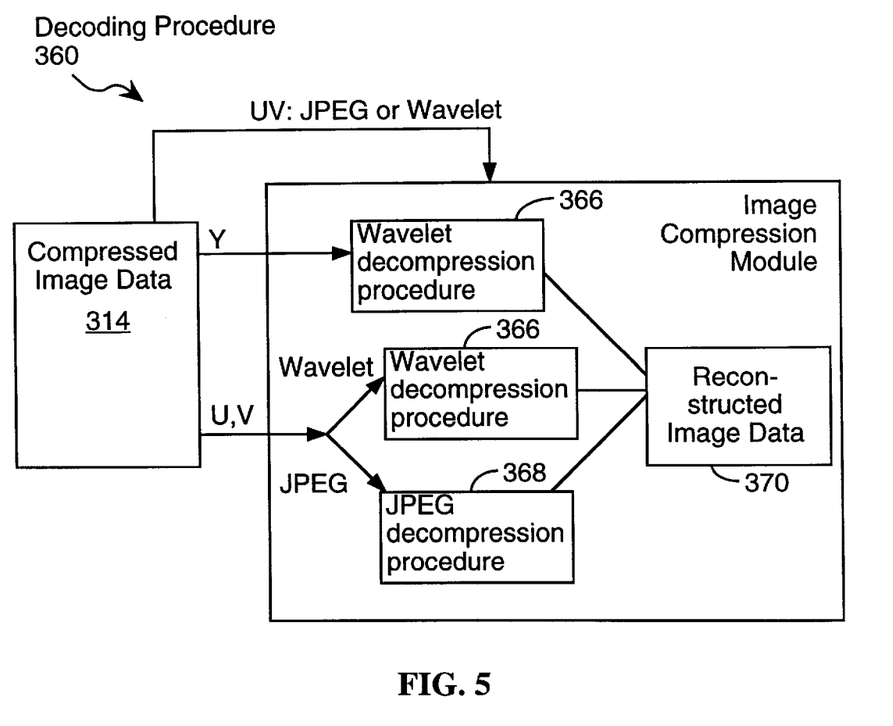
FIG. 5 depicts a flow chart of a preferred embodiment of the data decoding method of the present invention.

Referring to FIG. 5, the decoding procedure 360 works, in general, by reading and interpreting the encoded image data so as to reverse the process performed by the encoding procedure 300. The encoded image data includes encoded Y, U and V data.

Prior to the execution of the decoding procedure 360, or alternatively at the beginning of the decoding procedure, the type of encoding transformation (wavelet or JPEG) used to encode the U and V data is determined. In a preferred embodiment, the header 342 of the compressed image data is read to determine the encoding transformation that was used to encode the U and V data. This information is used to access the appropriate data decompression procedure.

The decoding procedure 360 decodes the encoded Y data by executing a wavelet decompression procedure 366 (in the wavelet transform module 192, FIG. 2) on the encoded Y data to generate reconstructed Y data. The wavelet decompression procedure 366 will typically include instructions for decoding the compressed Y data to generate a set of quantized coefficients, dequantizing the coefficients, and then performing inverse wavelet transformations on the dequantized coefficients.

When the encoded U and V data is determined to have been encoded using wavelet compression, the decompression procedure executes the wavelet decompression procedure 366 on the encoded U and V data to generate reconstructed U and V data. Otherwise, a JPEG decompression procedure 368 (in the JPEG transform module 194, FIG. 2) is executed on the encoded U and V data to generate reconstructed U and V data. The reconstructed Y, U and V data is assembled into a reconstructed image, stored in a reconstructed image data structure 370.

Alternate Embodiments

In a first alternate embodiment, the wavelet/JPEG encoding decision is made separately for U and V data, using a different compression ratio threshold or range for each. For instance, in this embodiment U data may be JPEG compressed for compression ratios in a first range of 5:1 to 20:1, while V data is JPEG compressed for compression ratios in a second range of 5:1 to 25:1. Outside these ranges wavelet compression is used.

In a second alternate embodiment, the received color image data is "multi-spectral" data. For instance, the received data for each pixel may include Y, $A_1$, $A_2$, $A_3$ and $A_4$ components, where Y represents the "luminance" of the pixel and $A_1$, $A_2$, $A_3$ and $A_4$ (or, more generally, $A_i$ for i=1 to N, where N is a positive integer greater than 1) represent different spectral components of the signal. In this embodiment, the Y data is always wavelet compressed, while each of the other $A_i$ components is JPEG compressed for compression ratios in a first range and otherwise is wavelet compressed. As in the first alternate embodiment, each spectral component could be JPEG compressed for a different range of compression ratios, and otherwise wavelet compressed.

While the description of the invention above has generally indicated that a system using the invention would have both an encoder and decoder, it is anticipated that in many commercial embodiments only a small number of users or machines would include both an encoder and decoder, while large numbers of user or machines would include only a decoder. For instance, decoders in accordance with the present invention might be included in a library of image viewer procedures distributed to users of various World Wide Web browsers, while only users interested in sending or distributing images to other persons might license the use of the encoder.

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding image data comprising the steps of:
   accessing Y, U and V data within the image data;
   compressing the Y data using a wavelet compression procedure;
   determining a compression ratio; and
   when the compression ratio is in a predefined low compression range, compressing the U and V data with a JPEG compression procedure, and otherwise compressing the U and V data with the wavelet compression procedure.

2. The method of claim 1, and further comprising the steps of:
   determining whether the image data is in RGB format; and
   when it is determined that the image data is in RGB format, converting the image data to YUV format.

3. A method of decoding encoded YUV format image data comprising the steps of:
   accessing encoded Y, U and V data within the encoded YUV format image data;
   decoding the encoded Y data with a wavelet decompression procedure;
   determining whether the encoded U and V data was encoded using wavelet compression;
   when it is determined that wavelet compression was used to encode the U and V data, decoding the encoded U and V data with the wavelet decompression procedure, and otherwise decoding the encoded U and V data with a JPEG decompression procedure.

4. An apparatus for encoding digital image data comprising:
   a processor;
   a working memory;
   input circuitry for receiving digital image data and a selection signal that corresponds to a selected image quality level selection, and for storing the received digital image data in the working memory; and
   circuitry coupled to the working memory for encoding the image data stored in the working memory, the image data including Y, U and V data, wherein the circuitry includes wavelet compression logic for compressing data using a wavelet compression method and JPEG compression logic for compressing data using a JPEG compression method, and control logic for directing the circuitry to compress the U and V data using the JPEG compression logic when the image quality level selection is in a predefined set of one or more high quality image levels and for otherwise directing the circuitry to compress the U and V data using the wavelet compression logic.

5. The apparatus of claim 4, and further comprising:
   an image capture device;
   non-volatile image storage memory for storing the encoded digital image; and
   an image viewer.

6. The apparatus of claim 4, and further comprising a decoder for decoding encoded image data, the encoded image data including encoded Y data and encoded U and encoded V data, the decoder including:
   inverse wavelet compression logic for decoding wavelet encoded data;
   inverse JPEG compression logic for decoding JPEG encoded data; and
   decoding control logic for determining whether the encoded U and encoded V data were encoded using wavelet compression, for decoding the encoded Y data using the inverse wavelet compression logic, for decoding the encoded U and encoded V data using the inverse wavelet compression logic when it is determined that the encoded U and encoded V data were encoded using wavelet compression, and for otherwise decoding the encoded U and encoded V data using the inverse JPEG compression logic.

7. A computer program product for use in conjunction with a computer system, the computer program product comprising a computer readable storage medium and a computer program mechanism embedded therein, the computer program mechanism comprising:
   a JPEG compression procedure for compressing image data;
   a wavelet compression procedure for compressing image data; and
   an image compression control procedure for controlling compression of image data that includes Y, U and V data, including:
      instructions for determining a compression ratio;
      instructions for compressing the Y data using the wavelet compression procedure; and
      instructions for compressing the U and V data with a JPEG compression procedure when the compression ratio is in a predefined low compression range, and otherwise compressing the U and V data with the wavelet compression procedure.

8. The computer program product of claim 7, and further comprising:
   a conversion procedure for converting image data in RGB format into Y, U and V data.

9. A method of encoding image data comprising the steps of:
   accessing within the image data a luminance component, Y, and a plurality of spectral components $A_i$, for i=1 to N, where N is a positive integer greater than 1;
   compressing the Y data using a wavelet compression procedure;
   determining a compression ratio; and
   when the compression ratio is in a first predefined range, compressing a first one of the spectral components $A_1$ with a JPEG compression procedure, and otherwise compressing the $A_1$ data with the wavelet compression procedure.

10. The method of claim 9, and further comprising the steps of:
    when the compression ratio is in a second predefined range, compressing a second one of the spectral components $A_2$ with a JPEG compression procedure, and otherwise compressing the $A_2$ data with the wavelet compression procedure.

11. An apparatus for encoding digital image data comprising:
    a processor;
    a working memory;
    input circuitry for receiving digital image data and a selection signal that corresponds to a selected image quality level selection, and for storing the received digital image data in the working memory; and
    circuitry coupled to the working memory for encoding the image data stored in the working memory, the image data including luminance data, Y, and a plurality of spectral component data $A_i$, for i=1 to N, where N is a positive integer greater than 1;

wherein the circuitry includes wavelet compression logic for compressing data using a wavelet compression method and JPEG compression logic for compressing data using a JPEG compression method, and control logic for directing the circuitry to compress the $A_1$ data for a first one of the spectral components using the JPEG compression logic when the image quality level selection is in a first predefined set of one or more high quality image levels and for otherwise directing the circuitry to compress the $A_1$ data using the wavelet compression logic.

12. The apparatus of claim 11, wherein the control logic directs the circuitry to compresses the $A_2$ data for a second one of the spectral components using the JPEG compression logic when the image quality level selection is in a second predefined set of high quality image levels and for otherwise directing the circuitry to compress the $A_2$ data using the wavelet compression logic.

* * * * *